US011289074B2

(12) United States Patent
Lee

(10) Patent No.: US 11,289,074 B2
(45) Date of Patent: Mar. 29, 2022

(54) ARTIFICIAL INTELLIGENCE APPARATUS FOR PERFORMING SPEECH RECOGNITION AND METHOD THEREOF

(71) Applicant: LG ELECTRONICS INC., Seoul (KR)

(72) Inventor: Kwangyong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 206 days.

(21) Appl. No.: 16/653,569

(22) Filed: Oct. 15, 2019

(65) Prior Publication Data

US 2020/0043478 A1    Feb. 6, 2020

(30) Foreign Application Priority Data

Oct. 1, 2019    (KR) .................. 10-2019-0121363

(51) Int. Cl.
| | |
|---|---|
| *G10L 15/16* | (2006.01) |
| *G10L 15/22* | (2006.01) |
| *G06N 20/00* | (2019.01) |
| *G10L 15/06* | (2013.01) |

(52) U.S. Cl.
CPC ............ *G10L 15/16* (2013.01); *G06N 20/00* (2019.01); *G10L 15/063* (2013.01); *G10L 15/22* (2013.01); *G10L 2015/223* (2013.01)

(58) Field of Classification Search
CPC ....... G10L 15/16; G10L 15/063; G10L 15/22; G10L 2015/223; G06N 20/00
See application file for complete search history.

(56) References Cited

U.S. PATENT DOCUMENTS

| | | | | |
|---|---|---|---|---|
| 9,390,726 | B1* | 7/2016 | Smus ...................... | G06F 3/017 |
| 9,697,829 | B1* | 7/2017 | Tickner ............... | G10L 15/1815 |
| 9,754,591 | B1* | 9/2017 | Kumar .................. | G10L 15/183 |
| 9,761,225 | B2* | 9/2017 | Gandrabur ............. | G10L 15/22 |
| 10,817,787 | B1* | 10/2020 | Zhang ..................... | G06N 5/046 |
| 2014/0046891 | A1* | 2/2014 | Banas .................... | G06N 5/022 |
| | | | | 706/46 |
| 2014/0309990 | A1* | 10/2014 | Gandrabur ............. | G06F 40/30 |
| | | | | 704/9 |
| 2018/0101602 | A1* | 4/2018 | Allen ................ | G06F 16/90332 |
| 2018/0150451 | A1* | 5/2018 | Allen .................... | G06F 40/295 |
| 2020/0258515 | A1* | 8/2020 | Suzuki ...................... | G06F 3/14 |

\* cited by examiner

*Primary Examiner* — Mohammad K Islam
(74) *Attorney, Agent, or Firm* — Lee Hong Degerman Kang & Waimey

(57) ABSTRACT

Disclosed herein is an artificial intelligence apparatus for performing speech recognition including a microphone configured to receive a speech command of a user, a learning processor configured to determine anaphora included in text data corresponding to the speech command using an anaphora recognition model for determining anaphora included in predetermined text data, and a processor configured to specify an object referred to by the determined anaphora based on context information including information input to or output from the artificial intelligence apparatus, determine a response to the speech command based on the specified object, and control the artificial intelligence apparatus according to the determined response.

14 Claims, 17 Drawing Sheets

ARTIFICIAL INTELLIGENCE APPARATUS FOR PERFORMING SPEECH RECOGNITION AND METHOD THEREOF

CROSS-REFERENCE TO RELATED APPLICATIONS

Pursuant to 35 U.S.C. § 119(a), this application claims the benefit of earlier filing date and right of priority to Korean Patent Application No. 10-2019-0121363, filed on Oct. 1, 2019, the contents of which are hereby incorporated by reference herein in its entirety.

BACKGROUND

The present disclosure relates to an artificial intelligence apparatus and method for performing speech recognition and, more particularly, an artificial intelligence apparatus and method for performing speech recognition by specifying an object referred to by anaphora, based on context information including information input to or output from the artificial intelligence apparatus.

Competition for speech recognition technology which has started in smartphones is expected to become fiercer in the home with diffusion of the Internet of things (IoT).

In particular, an artificial intelligence (AI) device capable of issuing a command using speech and having a talk is noteworthy.

A speech recognition service has a structure for selecting an optimal answer to a user's question using a vast amount of database.

A speech search function refers to a method of converting input speech data into text in a cloud server, analyzing the text and retransmitting a real-time search result to a device.

The cloud server has a computing capability capable of dividing a large number of words into speech data according to gender, age and intonation and storing and processing the speech data in real time.

As more speech data is accumulated, speech recognition will be accurate, thereby achieving human parity.

Meanwhile, people may utter a speech command including anaphora in order to a device through the speech command.

In this case, a speech recognition system is highly likely to fail in natural language processing when it is impossible to accurately specify an object referred to by anaphora.

Accordingly, there is an increasing need for a function accurately specifying an object referred to by anaphora.

SUMMARY

An object of the present disclosure is to solve the above-described problems and the other problems.

Another object of the present disclosure is to provide an artificial intelligence apparatus and method for performing speech recognition based on context information.

Another object of the present disclosure is to provide an artificial intelligence apparatus and method for performing speech recognition by determining an object referred to by anaphora included in a speech command.

Another object of the present disclosure is to provide an artificial intelligence apparatus and method for performing speech recognition by determining an object referred to by anaphora based on screen context information.

According to an embodiment, an artificial intelligence apparatus for performing speech recognition includes a microphone configured to receive a speech command of a user, a learning processor configured to determine anaphora included in text data corresponding to the speech command using an anaphora recognition model for determining anaphora included in predetermined text data, and a processor configured to specify an object referred to by the determined anaphora based on context information including information input to or output from the artificial intelligence apparatus, determine a response to the speech command based on the specified object, and control the artificial intelligence apparatus according to the determined response.

According to another embodiment, a speech recognition method performed by an artificial intelligence apparatus includes receiving a speech command of a user, determining anaphora included in text data corresponding to the speech command using an anaphora recognition model for determining anaphora included in predetermined text data, specifying an object referred to by the determined anaphora based on context information including information input to or output from the artificial intelligence apparatus, determining a response to the speech command based on the specified object, and controlling the artificial intelligence apparatus according to the determined response.

DETAILED DESCRIPTION OF THE EMBODIMENTS

Figure 1:
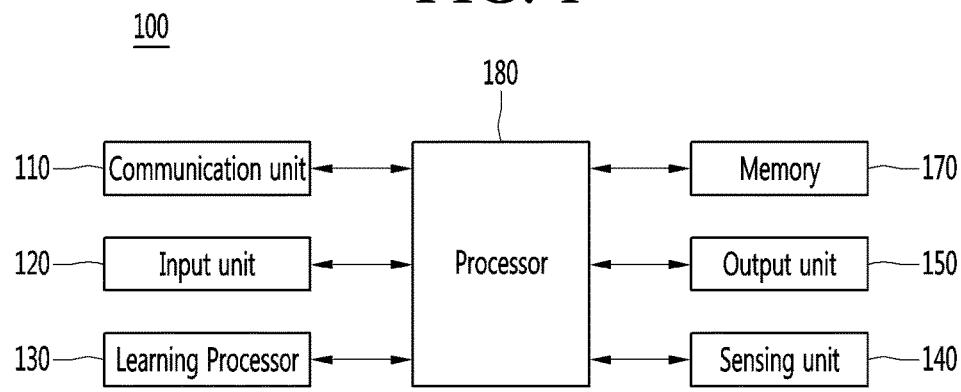
FIG. 1 illustrates an AI device 100 according to an embodiment of the present disclosure.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the disclosure in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being "connected" to another part (or element, device, etc.), it should be understood that the former can be "directly connected" to the latter, or "electrically connected" to the latter via an intervening part (or element, device, etc.). It will be further understood that when one component is referred to as being "directly connected" or "directly linked" to another component, it means that no intervening component is present.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 illustrates an AI device 100 according to an embodiment of the present disclosure.

The AI device (or an AI apparatus) 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices such as other AI devices 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™ RFID (Radio Frequency Identification), Infrared Data Association (IrDA), ZigBee, NFC (Near Field Communication), and the like.

The input unit 120 may acquire various kinds of data.

At this time, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used when an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
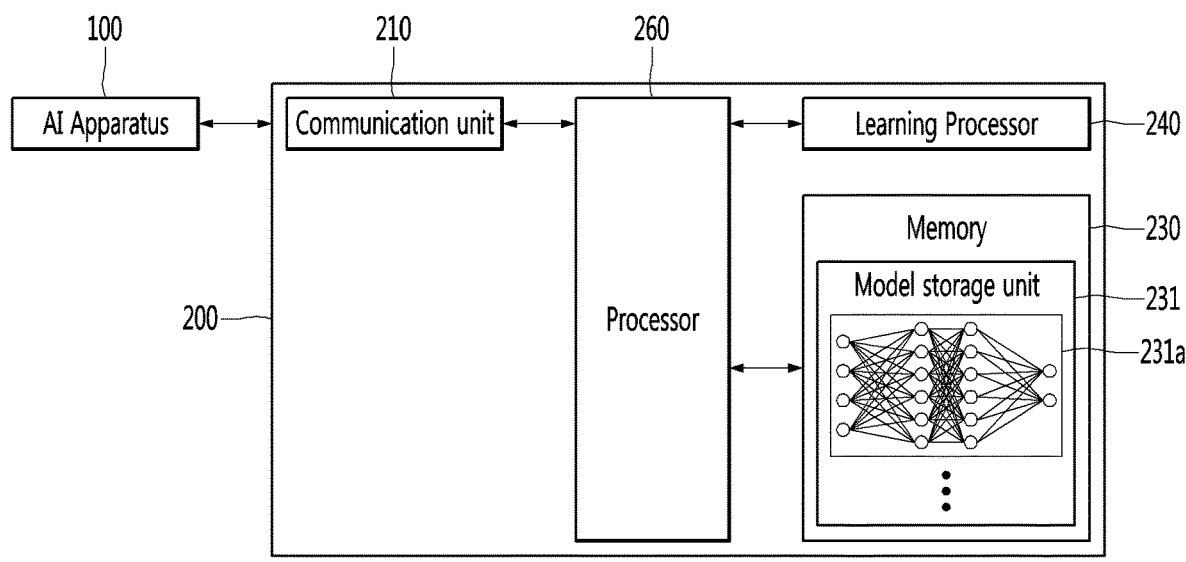
FIG. 2 illustrates an AI server 200 according to an embodiment of the present disclosure.

FIG. 2 illustrates an AI server 200 according to an embodiment of the present disclosure.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication unit 210, a memory 230, a learning processor 240, a processor 260, and the like.

The communication unit 210 can transmit and receive data to and from an external device such as the AI device 100.

The memory 230 may include a model storage unit 231. The model storage unit 231 may store a learning or learned model (or an artificial neural network 231a) through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
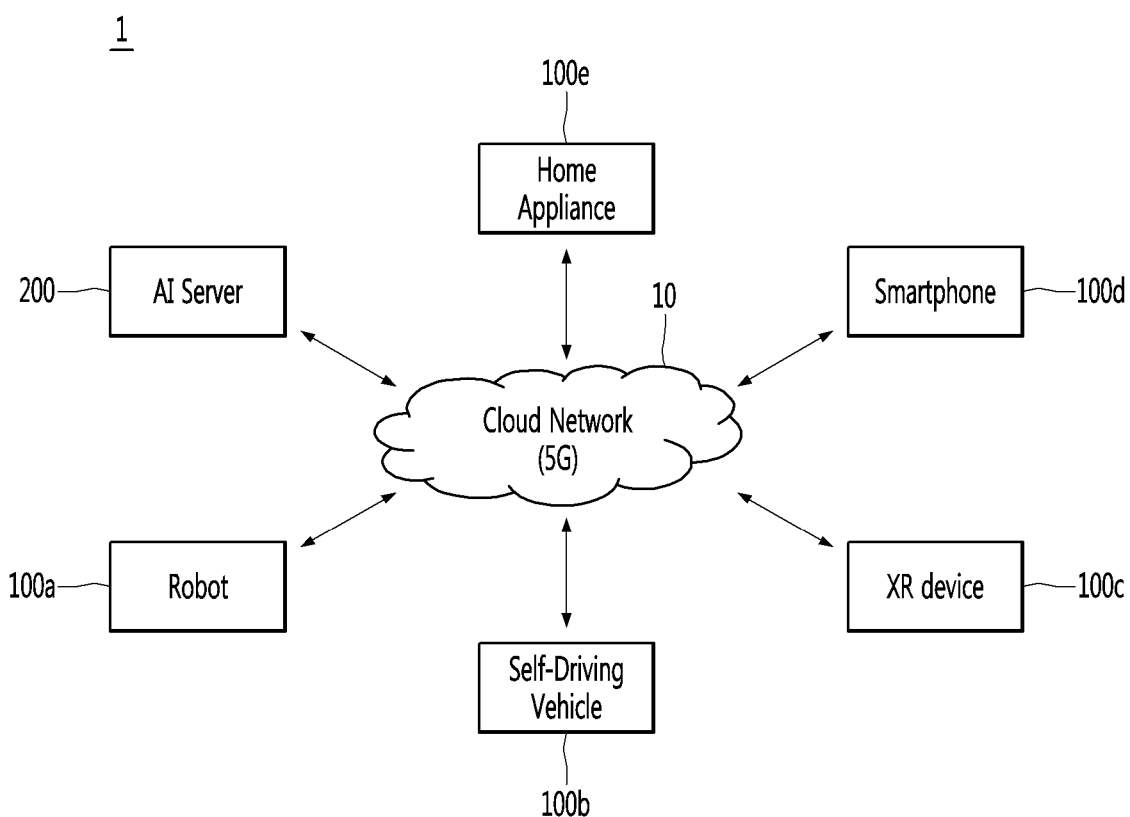
FIG. 3 illustrates an AI system 1 according to an embodiment of the present disclosure.

FIG. 3 illustrates an AI system 1 according to an embodiment of the present disclosure.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 200 may learn the artificial neural network according to the machine learning algorithm instead of the AI devices 100a to 100e, and may directly store the learning model or transmit the learning model to the AI devices 100a to 100e.

At this time, the AI server 200 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. At this time, the robot 100a may acquire the intention information of the interaction due to the user's operation or speech utterance, and may determine the response based on the acquired intention information, and may perform the operation.

<AI+Self-Driving>

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may acquire state information about the self-driving vehicle 100b by using sensor information acquired from various kinds of sensors, may detect (recognize) surrounding environment and objects, may generate map data, may determine the route and the travel plan, or may determine the operation.

Like the robot 100a, the self-driving vehicle 100b may use the sensor information acquired from at least one sensor among the lidar, the radar, and the camera so as to determine the travel route and the travel plan.

In particular, the self-driving vehicle 100b may recognize the environment or objects for an area covered by a field of view or an area over a certain distance by receiving the sensor information from external devices, or may receive directly recognized information from the external devices.

The self-driving vehicle 100b may perform the above-described operations by using the learning model composed of at least one artificial neural network. For example, the self-driving vehicle 100b may recognize the surrounding environment and the objects by using the learning model, and may determine the traveling movement line by using the recognized surrounding information or object information. The learning model may be learned directly from the self-driving vehicle 100a or may be learned from an external device such as the AI server 200.

At this time, the self-driving vehicle 100b may perform the operation by generating the result by directly using the learning model, but the sensor information may be transmitted to the external device such as the AI server 200 and the generated result may be received to perform the operation.

The self-driving vehicle 100b may use at least one of the map data, the object information detected from the sensor information, or the object information acquired from the external apparatus to determine the travel route and the travel plan, and may control the driving unit such that the self-driving vehicle 100b travels along the determined travel route and travel plan.

The map data may include object identification information about various objects arranged in the space (for example, road) in which the self-driving vehicle 100b travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100b may perform the operation or travel by controlling the driving unit based on the control/interaction of the user. At this time, the self-driving vehicle 100b may acquire the intention information of the interaction due to the user's operation or speech utterance, and may determine the response based on the acquired intention information, and may perform the operation.

<AI+XR>

The XR device 100c, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100c may analyzes three-dimensional point cloud data or image data acquired from various sensors or the external devices, generate position data and attribute data for the three-dimensional points, acquire information about the surrounding space or the real object, and render to output the XR object to be output. For example, the XR device 100c may output an XR object including the additional information about the recognized object in correspondence to the recognized object.

The XR device 100c may perform the above-described operations by using the learning model composed of at least one artificial neural network. For example, the XR device 100c may recognize the real object from the three-dimensional point cloud data or the image data by using the learning model, and may provide information corresponding to the recognized real object. The learning model may be directly learned from the XR device 100c, or may be learned from the external device such as the AI server 200.

At this time, the XR device 100c may perform the operation by generating the result by directly using the learning model, but the sensor information may be transmitted to the external device such as the AI server 200 and the generated result may be received to perform the operation.

<AI+Robot+Self-Driving>

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given movement line without the user's control or moves for itself by determining the movement line by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

At this time, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driving unit of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

<AI+Robot+XR>

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot that is subjected to control/interaction in an XR image. In this case, the robot 100a may be separated from the XR device 100c and interwork with each other.

When the robot 100a, which is subjected to control/interaction in the XR image, may acquire the sensor information from the sensors including the camera, the robot 100a or the XR device 100c may generate the XR image based on the sensor information, and the XR device 100c may output the generated XR image. The robot 100a may operate based on the control signal input through the XR device 100c or the user's interaction.

For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

<AI+Self-Driving+XR>

The self-driving vehicle 100b, to which the AI technology and the XR technology are applied, may be implemented as a mobile robot, a vehicle, an unmanned flying vehicle, or the like.

The self-driving driving vehicle 100b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

At this time, when the XR object is output to the HUD, at least part of the XR object may be outputted so as to overlap the actual object to which the passenger's gaze is directed. Meanwhile, when the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, may acquire the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

Figure 4:
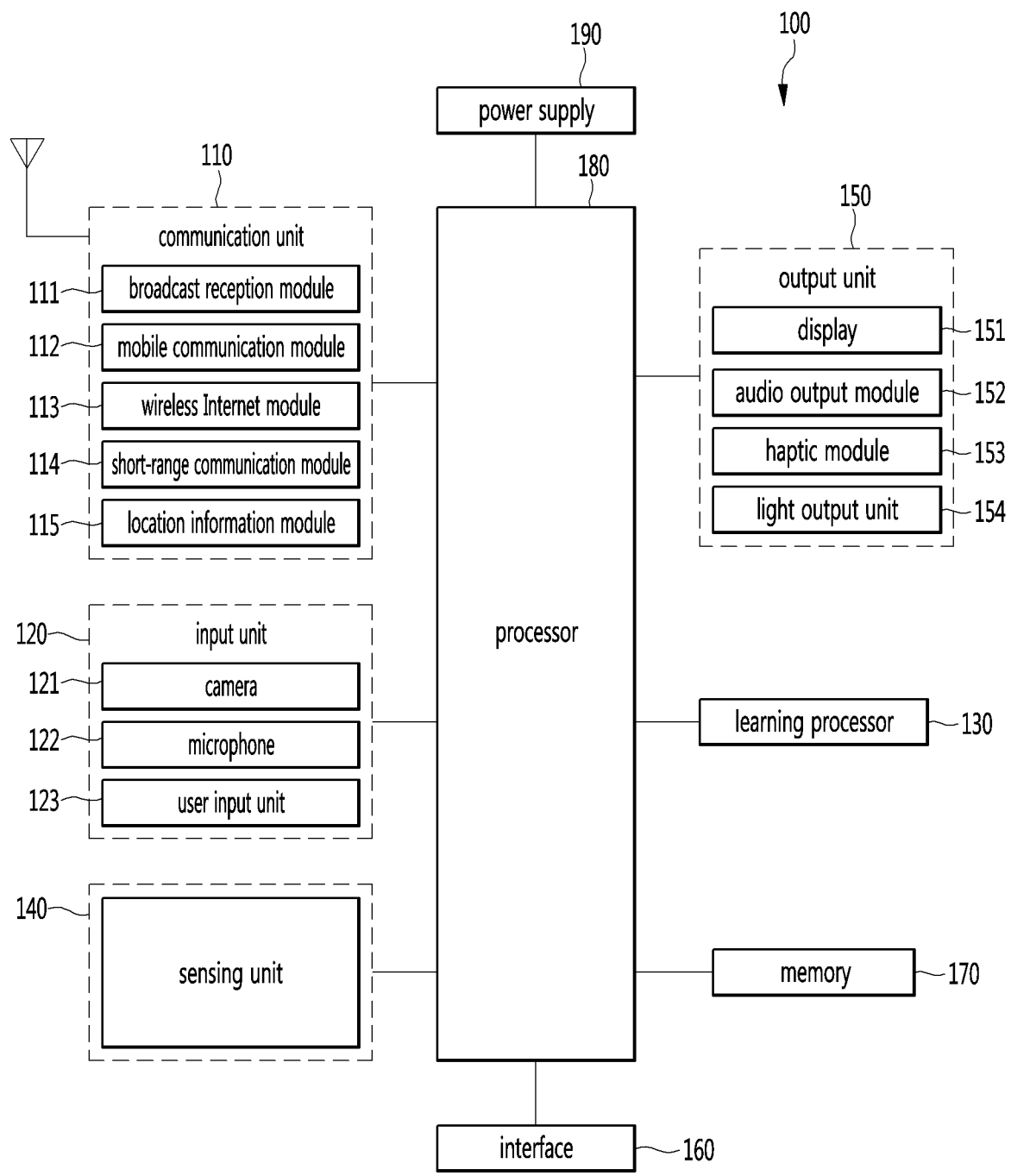
FIG. 4 is a block diagram illustrating an artificial intelligence device according to the present disclosure.

FIG. 4 is a block diagram illustrating an artificial intelligence apparatus according to the present disclosure.

A description overlapping FIG. 1 will be omitted.

The communication unit 110 may include at least one of a broadcast reception module 111, a mobile communication module 112, a wireless Internet module 113, a short-range communication module 114 and a location information module 115.

The broadcast reception module 111 receives broadcast signals and/or broadcast associated information from an external broadcast management server through a broadcast channel.

The mobile communication module 112 may transmit and/or receive wireless signals to and from at least one of a base station, an external terminal, a server, and the like over a mobile communication network established according to technical standards or communication methods for mobile communication (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

The wireless Internet module 113 is configured to facilitate wireless Internet access. This module may be installed inside or outside the artificial intelligence apparatus 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like.

The short-range communication module 114 is configured to facilitate short-range communication and to support short-range communication using at least one of Bluetooth™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The location information module 115 is generally configured to acquire the position (or the current position) of the mobile artificial intelligence apparatus. Representative examples thereof include a Global Position System (GPS) module or a Wi-Fi module. As one example, when the artificial intelligence apparatus uses a GPS module, the position of the mobile artificial intelligence apparatus may be acquired using a signal sent from a GPS satellite.

The input unit 120 may include a camera 121 for receiving a video signal, a microphone 122 for receiving an audio signal, and a user input unit 123 for receiving information from a user.

The camera 121 may process image frames of still images or moving images obtained by image sensors in a video call more or an image capture mode. The processed image frames can be displayed on the display 151 or stored in memory 170.

The microphone 122 processes an external acoustic signal into electrical audio data. The processed audio data may be variously used according to function (application program) executed in the artificial intelligence apparatus 100. Meanwhile, the microphone 122 may include various noise removal algorithms to remove noise generated in the process of receiving the external acoustic signal.

The user input unit 123 receives information from a user. When information is received through the user input unit 123, the processor 180 may control operation of the artificial intelligence apparatus 100 in correspondence with the input information.

The user input unit 123 may include one or more of a mechanical input element (for example, a mechanical key, a button located on a front and/or rear surface or a side surface of the artificial intelligence apparatus 100, a dome switch, a jog wheel, a jog switch, and the like) or a touch input element. As one example, the touch input element may be a virtual key, a soft key or a visual key, which is displayed on a touchscreen through software processing, or a touch key located at a location other than the touchscreen.

The output unit 150 is typically configured to output various types of information, such as audio, video, tactile output, and the like. The output unit 150 may include a display 151, an audio output module 152, a haptic module 153, and a light output unit 154.

The display 151 is generally configured to display (output) information processed in the artificial intelligence apparatus 100. For example, the display 151 may display execution screen information of an application program executed by the artificial intelligence apparatus 100 or user interface (UI) and graphical user interface (GUI) information according to the executed screen information.

The display 151 may have an inter-layered structure or an integrated structure with a touch sensor in order to realize a touchscreen. The touchscreen may provide an output interface between the artificial intelligence apparatus 100 and a user, as well as function as the user input unit 123 which provides an input interface between the artificial intelligence apparatus 100 and the user.

The audio output module 152 is generally configured to output audio data received from the communication unit 110 or stored in the memory 170 in a call signal reception mode, a call mode, a record mode, a speech recognition mode, a broadcast reception mode, and the like.

The audio output module 152 may also include a receiver, a speaker, a buzzer, or the like.

A haptic module 153 can be configured to generate various tactile effects that a user feels. A typical example of a tactile effect generated by the haptic module 153 is vibration.

A light output unit 154 may output a signal for indicating event generation using light of a light source of the artificial intelligence apparatus 100. Examples of events generated in the artificial intelligence apparatus 100 may include message reception, call signal reception, a missed call, an alarm, a schedule notice, email reception, information reception through an application, and the like.

The interface 160 serves as an interface with external devices to be connected with the artificial intelligence apparatus 100. The interface 160 may include wired or wireless headset ports, external power supply ports, wired or wireless data ports, memory card ports, ports for connecting a device having an identification module, audio input/output (I/O) ports, video I/O ports, earphone ports, or the like. The artificial intelligence apparatus 100 may perform appropriate control related to the connected external device in correspondence with connection of the external device to the interface 160.

The identification module may be a chip that stores a variety of information for granting use authority of the artificial intelligence apparatus 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the artificial intelligence apparatus 100 via the interface 160.

The power supply 190 receives external power or internal power and supplies the appropriate power required to operate respective components included in the artificial intelligence apparatus 100, under control of the controller 180. The power supply 190 may include a battery, and the battery may be a built-in or rechargeable battery.

Meanwhile, as described above, the processor 180 controls operation related to the application program and overall operation of the artificial intelligence apparatus 100. For example, the processor 180 may execute or release a lock function for limiting input of a control command of the user to applications when the state of the mobile artificial intelligence apparatus satisfies a set condition.

Figure 5:
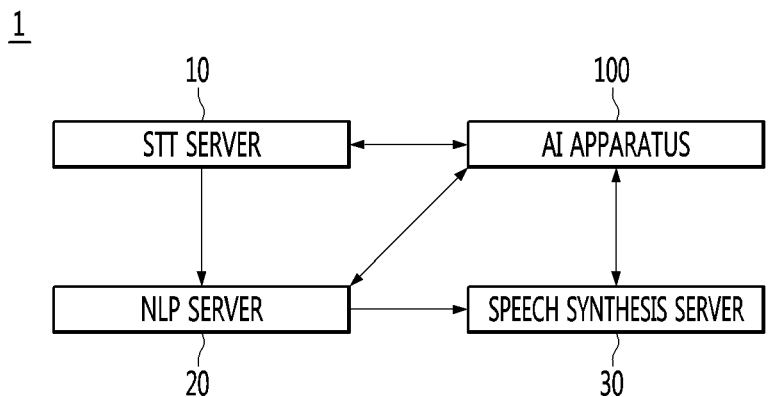
FIG. 5 is a diagram illustrating a speech system according to an embodiment of the present disclosure.

FIG. 5 is a diagram illustrating a speech system according to an embodiment of the present disclosure.

Referring to FIG. 5, the speech system 1 includes an artificial intelligence apparatus 100, a speech-to-text (STT) server 10, a natural language processing (NLP) server 20 and a speech synthesis server 30.

The artificial intelligence apparatus 100 may transmit speech data to the STT server 10.

The STT server 10 may convert the speech data received from the artificial intelligence apparatus 100 into text data.

The STT server 10 may increase accuracy of speech-text conversion using a language model.

The language model may mean a model capable of calculating a probability of a sentence or a probability of outputting a next word is output when previous words are given.

For example, the language model may include probabilistic language models such as a unigram model, a bigram model, an N-gram model, etc.

The unigram model refers to a model that assumes that use of all words is completely independent of each other and calculates the probability of a word string by a product of the probabilities of words.

The bigram model refers to a model that assumes that use of words depends on only one previous word.

The N-gram model refers to a model that assumes that use of words depends on (n−1) previous words.

That is, the STT server 10 may determine when the speech data is appropriately converted into the text data using the language model, thereby increasing accuracy of conversion into the text data.

The NLP server 20 may receive the text data from the STT server 10. The NLP server 20 may analyze the intention of the text data based on the received text data.

The NLP server 20 may transmit intention analysis information indicating the result of performing intention analysis to the artificial intelligence apparatus 100.

The NLP server 20 may sequentially perform a morpheme analysis step, a syntax analysis step, a speech-act analysis step, a dialog processing step with respect to text data, thereby generating intention analysis information.

The morpheme analysis step refers to a step of classifying the text data corresponding to the speech uttered by the user into morphemes as a smallest unit having a meaning and determining the part of speech of each of the classified morphemes.

The syntax analysis step refers to a step of classifying the text data into a noun phrase, a verb phrase, an adjective phrase, etc. using the result of the morpheme analysis step and determines a relation between the classified phrases.

Through the syntax analysis step, the subject, object and modifier of the speech uttered by the user may be determined.

The speech-act analysis step refers to a step of analyzing the intention of the speech uttered by the user using the result of the syntax analysis step. Specifically, the speech-act step refers to a step of determining the intention of a sentence such as whether the user asks a question, makes a request, or expresses simple emotion.

The dialog processing step refers to a step of determining whether to answer the user's utterance, respond to the user's utterance or question about more information.

The NLP server 20 may generate intention analysis information including at least one of the answer to, a response to, or a question about more information on the intention of the user's utterance, after the dialog processing step.

Meanwhile, the NLP server 20 may receive the text data from the artificial intelligence apparatus 100. For example, when the artificial intelligence apparatus 100 supports the speech-to-text conversion function, the artificial intelligence apparatus 100 may convert the speech data into the text data and transmit the converted text data to the NLP server 20.

The speech synthesis server 30 may synthesize prestored speech data to generate a synthesized speech.

The speech synthesis server 30 may record the speech of the user selected as a model and divide the recorded speech into syllables or words. The speech synthesis server 30 may store the divided speech in an internal or external database in syllable or word units.

The speech synthesis server 30 may retrieve syllables or words corresponding to the given text data from the database and synthesize the retrieved syllables or words, thereby generating the synthesized speech.

The speech synthesis server 30 may store a plurality of speech language groups respectively corresponding to a plurality of languages.

For example, the speech synthesis server 30 may include a first speech language group recorded in Korean and a second speech language group recorded in English.

The speech synthesis server 30 may translate text data of a first language into text of a second language and generate a synthesized speech corresponding to the translated text of the second language using the second speech language group.

The speech synthesis server 30 may transmit the synthesized speech to the artificial intelligence apparatus 100.

The speech synthesis server 30 may receive the intention analysis information from the NLP server 20.

The speech synthesis server 30 may generate the synthesized speech including the intention of the user based on the intention analysis information.

In one embodiment, the STT server 10, the NLP server 20 and the speech synthesis server 30 may be implemented as one server.

The respective functions of the STT server 10, the NLP server 20 and the speech synthesis server 30 may also be performed in the artificial intelligence apparatus 100. To this end, the artificial intelligence apparatus 100 may include a plurality of processors.

Figure 6:
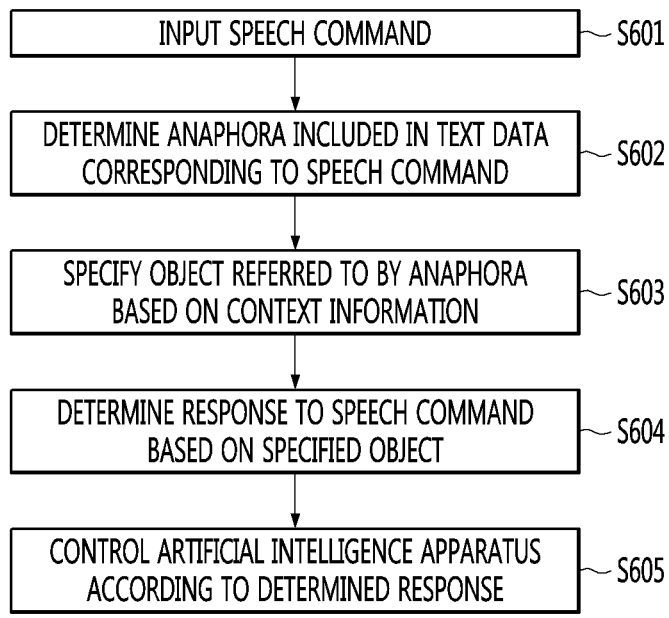
FIG. 6 is a flowchart illustrating a method of performing speech recognition by specifying an object referred to by anaphora included in a speech command according to an embodiment of the present disclosure.

FIG. 6 is a flowchart illustrating a method of performing speech recognition by specifying an object referred to by anaphora included in a speech command according to an embodiment of the present disclosure.

The microphone 122 may receive a speech command of a user (S601).

The speech command may be a user's speech signal for controlling the artificial intelligence apparatus 100. The processor 180 may acquire the speech command of the user input via the microphone 122. For example, the user may utter a speech command for sending an email to a friend via the artificial intelligence apparatus 100, and the microphone 122 may receive the uttered speech command.

Meanwhile, the processor 180 may receive the speech command of the user via the communication unit 110. In addition, the processor 180 may acquire a text command replacing the speech command of the user via the user input unit 123.

In addition, the processor 180 may convert the speech command acquired via the microphone 122 into text data using an STT engine. Accordingly, the processor 180 may acquire the text data corresponding to the speech command of the user.

The learning processor 130 may determine anaphora included in the text data corresponding to the speech command, using an anaphora recognition model for determining anaphora included in predetermined text data (S602).

The anaphora depends on the premise or previous example of a previous expression or context. The anaphora may include a noun phrase starting with a pronoun or a demonstrative determiner.

For example, in a corpus "Send these pictures to her", "these" corresponds to an "demonstrative determiner" and "pictures" corresponds to a noun. Accordingly, "these pictures" may be a noun phrase starting with the demonstrative determiner and may correspond to anaphora. In addition, "her" may be a personal pronoun and may correspond to anaphora.

In addition, the anaphora may include at least one of adjacent anaphora referring to an object adjacent to a person or a thing and non-adjacent anaphora which is not adjacent to a person or a thing. For example, the adjacent anaphora referring to the object adjacent to the person or thing may include a noun phrase starting with a demonstrative determiner "this or these" or a proximal demonstrative pronoun such as "this" or "here". In addition, the non-adjacent anaphora referring to an object which is not adjacent to the person or thing may include a far demonstrative pronoun such as a noun phrase starting "that" or "those", a distal demonstrative pronoun "that" or "there", a medial demonstrative pronoun "it" or "there" and a third-person pronoun "her", "him" or "them".

The anaphora recognition model may be a neural network trained by a machine learning algorithm or a deep learning algorithm to output an anaphora tagging value for a character or word included in input predetermined text data when the predetermined text data is input to an input layer.

Figure 7:
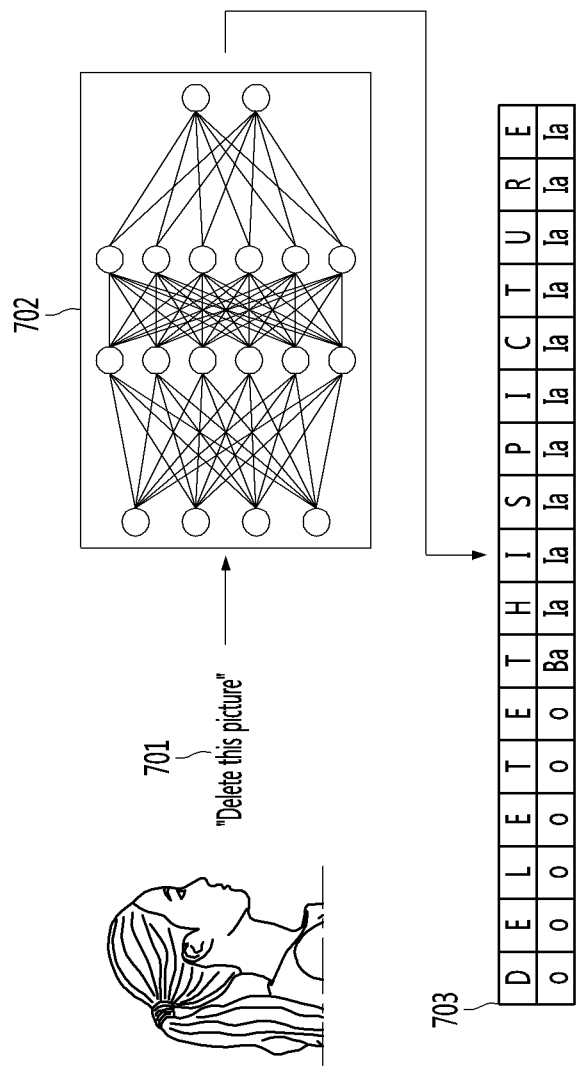
FIG. 7 is a view illustrating an anaphora recognition model according to an embodiment of the present disclosure.

Referring to FIG. 7, if the text data 701 corresponding to the speech command of the user is "Delete this picture", the anaphora recognition model 702 may output the anaphora tagging value 703 for each character of the text data. In "Delete this picture", "this picture" is a noun phrase beginning with a demonstrative determiner and corresponds to anaphora. The anaphora recognition model may tag a Ba (Begin anaphora) value on a beginning character "t" of the anaphora and tag an Ia (Inside anaphora) value on characters "h, i, s, p, i, c, t, u, r, e" corresponding to the anaphora. In this case, the tagging value is not limited thereto and may be variously implemented.

In addition, the anaphora recognition model may output the anaphora tagging value for each word of the text data. For example, the anaphora recognition model may tag a value indicating that "this" and "picture" correspond to the anaphora within the text data "Delete this picture".

Figure 12:
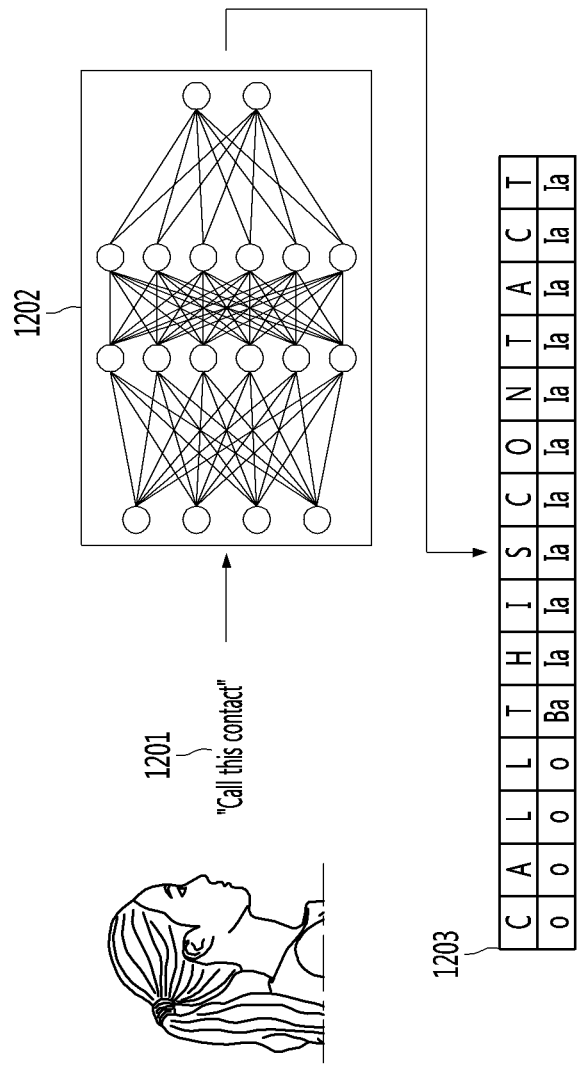
FIGS. 12 to 14 are views illustrating a process of performing speech recognition using an anaphora recognition model according to an embodiment of the present disclosure.

Referring to FIG. 12, if the text data corresponding to the speech command of the user is "Call this contact", the anaphora recognition model may output the anaphora tagging value of each character of the text data. In "Call this contact", "this contact" is a noun phrase starting with a demonstrative determiner and corresponds to anaphora. The anaphora recognition model may tag a Ba (Begin anaphora) value on a beginning character "t" of the anaphora and tag an Ia (Inside anaphora) value on characters "h, i, s, c, o, n, t, a, c, t" corresponding to the anaphora.

In addition, the anaphora recognition model may output the anaphora tagging value for each word of the text data. For example, the anaphora recognition model may tag a value indicating that "this" and "contact" corresponds to the anaphora within the text data "Call this contact".

In addition, the learning processor 130 may determine the adjacent anaphora or the non-adjacent anaphora included in the text data corresponding to the speech command using the anaphora recognition model.

Figure 16:
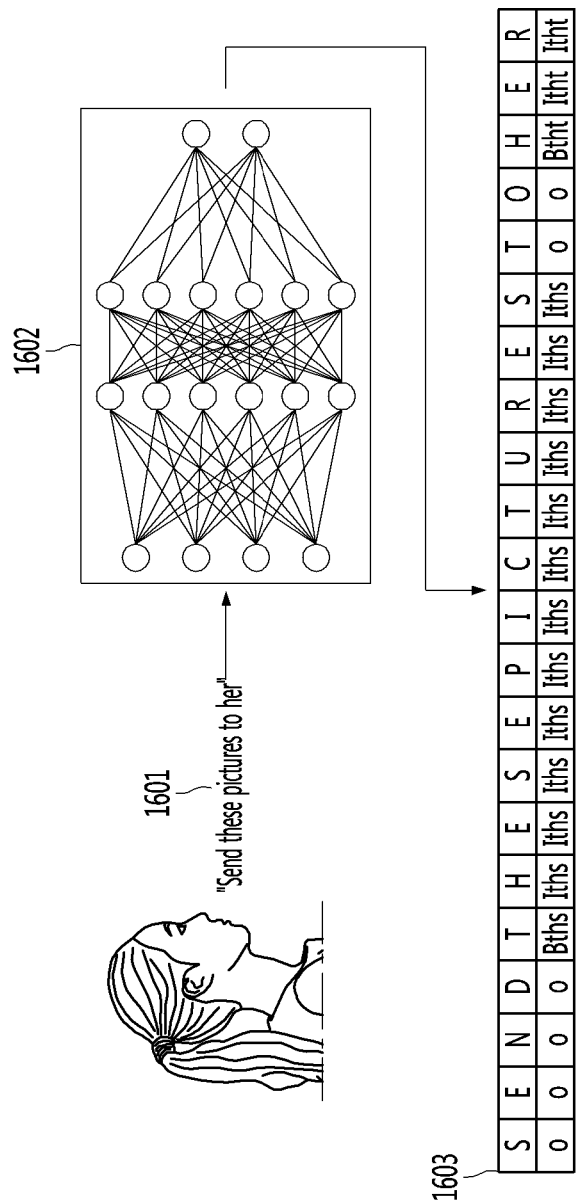
FIGS. 16 to 18 are views illustrating a process of performing speech recognition by distinguishing between adjacent anaphora and non-adjacent anaphora according to an embodiment of the present disclosure.

Referring to FIG. 16, if text data 1601 corresponding to the speech command of the user is "Send these pictures to her", the anaphora recognition model 1602 may output an adjacent anaphora or non-adjacent anaphora tagging value 1603 for each character of the text data. In "Send these pictures to her", "these pictures" is a noun phrase starting with the demonstrative determiner "these" and corresponds to adjacent anaphora.

In addition, "her" is a third-person pronoun and corresponds to non-adjacent anaphora.

The anaphora recognition model 1602 may tag a Bths (Begin anaphora of "this") value on a beginning character "t" of the adjacent anaphora and tag an Iths (Inside anaphora of "this") value on characters "h, e, s, e, p, i, c, t, u, r, e, s" corresponding to the anaphora. In this case, the tagging values are not limited thereto and may be variously implemented.

In addition, the anaphora recognition model 1602 may tag a Btht (Begin anaphora of "that") value on a beginning character "h" of the non-adjacent anaphora and tag an Itht (Inside anaphora of "that") value on characters "e, r" corresponding to the anaphora. In this case, the tagging values are not limited thereto and may be variously implemented.

The processor 180 may specify an object referred to by the anaphora based on context information (S603).

The processor 180 may specify an object referred to by the determined anaphora based on context information including information input or output between the user and the artificial intelligence apparatus 100.

The processor 180 may specify an object referred to by the determined anaphora based on context information including information input to the artificial intelligence apparatus 100 or information output from the artificial intelligence apparatus 100.

The context information may include information received from the user via the input unit 120 of the artificial intelligence apparatus 100 and information output via the output unit 150 of the artificial intelligence apparatus 100. The memory 170 may store the context information.

The context information may include screen context information.

The screen context information may include information on output content output via the display 151 of the artificial intelligence apparatus. In this case, the output content may include information capable of being displayed on a screen, such as text, pictures, video, a call history, applications, etc.

In addition, the screen context information may include information on selected content selected by the user. For example, when a plurality of pictures is displayed on a display, the user may touch a display screen and select some of the plurality of pictures. In this case, the selected pictures may be regarded as selected content.

Figure 8:
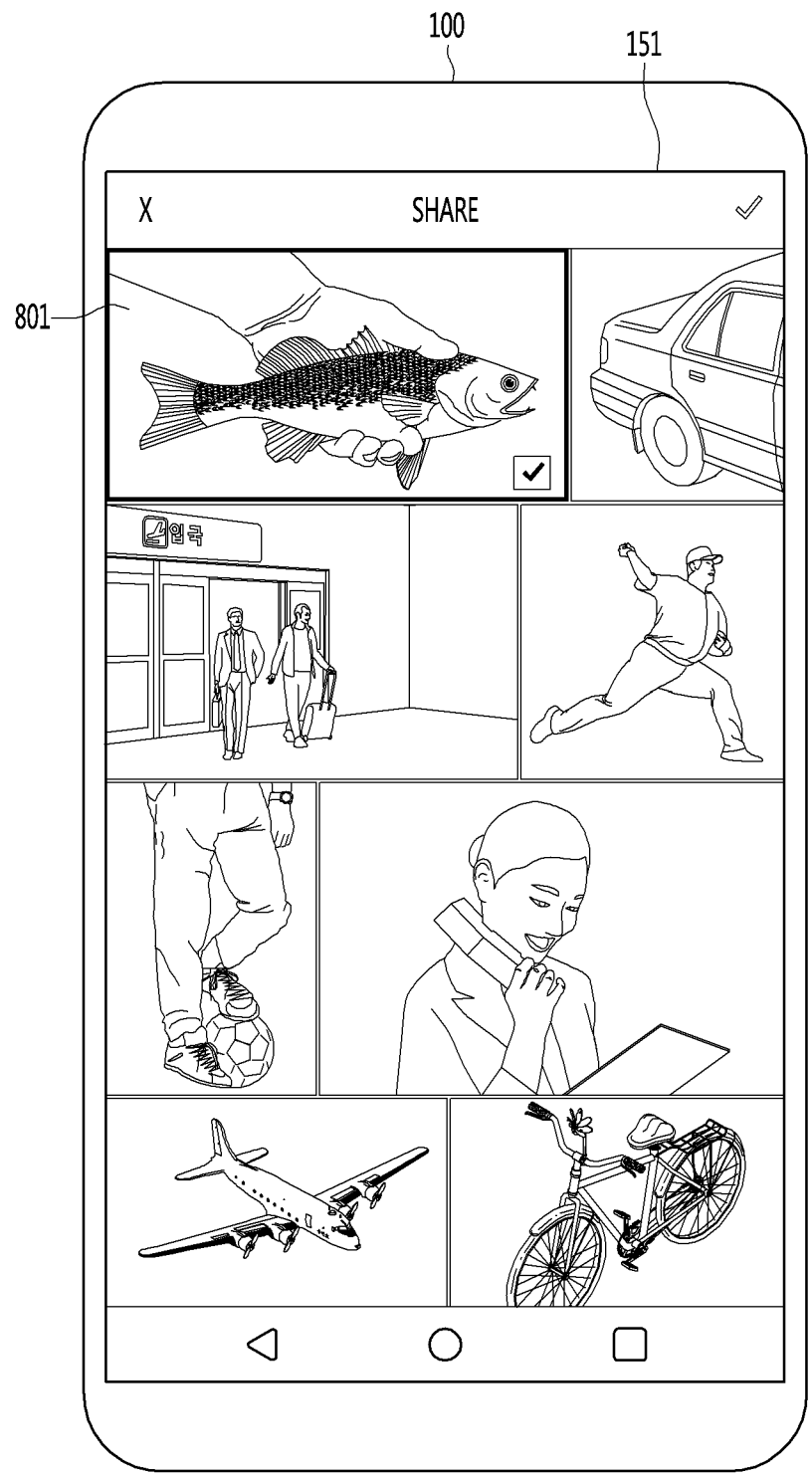
FIGS. 8 to 11 are views illustrating a process of specifying anaphora based on context information to perform speech recognition according to an embodiment of the present disclosure.

For example, referring to FIG. 8, the plurality of pictures is output via the display 151 of the artificial intelligence apparatus 100. The plurality of output pictures may become output content. In addition, the picture 801 selected by the user may become selected content.

The processor 180 may specify an object referred to by the anaphora based on the selected content when at least one selected content is present.

For example, referring to FIGS. 7 and 8, if the text data corresponding to the speech command of the user is "Delete this picture", the learning processor 130 may determine that "this picture" corresponds to anaphora using the anaphora recognition model, and the processor 180 may specify the selected picture 801 as an object referred to by the determined anaphora "this picture" based on the screen context information.

Figure 13:

In addition, referring to FIGS. 12 and 13, if the text data corresponding to the speech command of the user is "Call this contact", the learning processor 130 may determine that "this contact" corresponds to anaphora using the anaphora recognition model. In addition, a list of a plurality of contacts is output via the display 151 of the artificial intelligence apparatus 100. The plurality of output contacts may be output content. A contact 1301 selected by the user may be selected content. The processor 180 may specify the selected contact 1301 as the object referred to by the determined anaphora "this contact" based on the screen context information.

If the output content is full-screen content output on the full screen of the display, the processor 180 may specify the object referred to by the anaphora based on the full-screen content.

Figure 10:
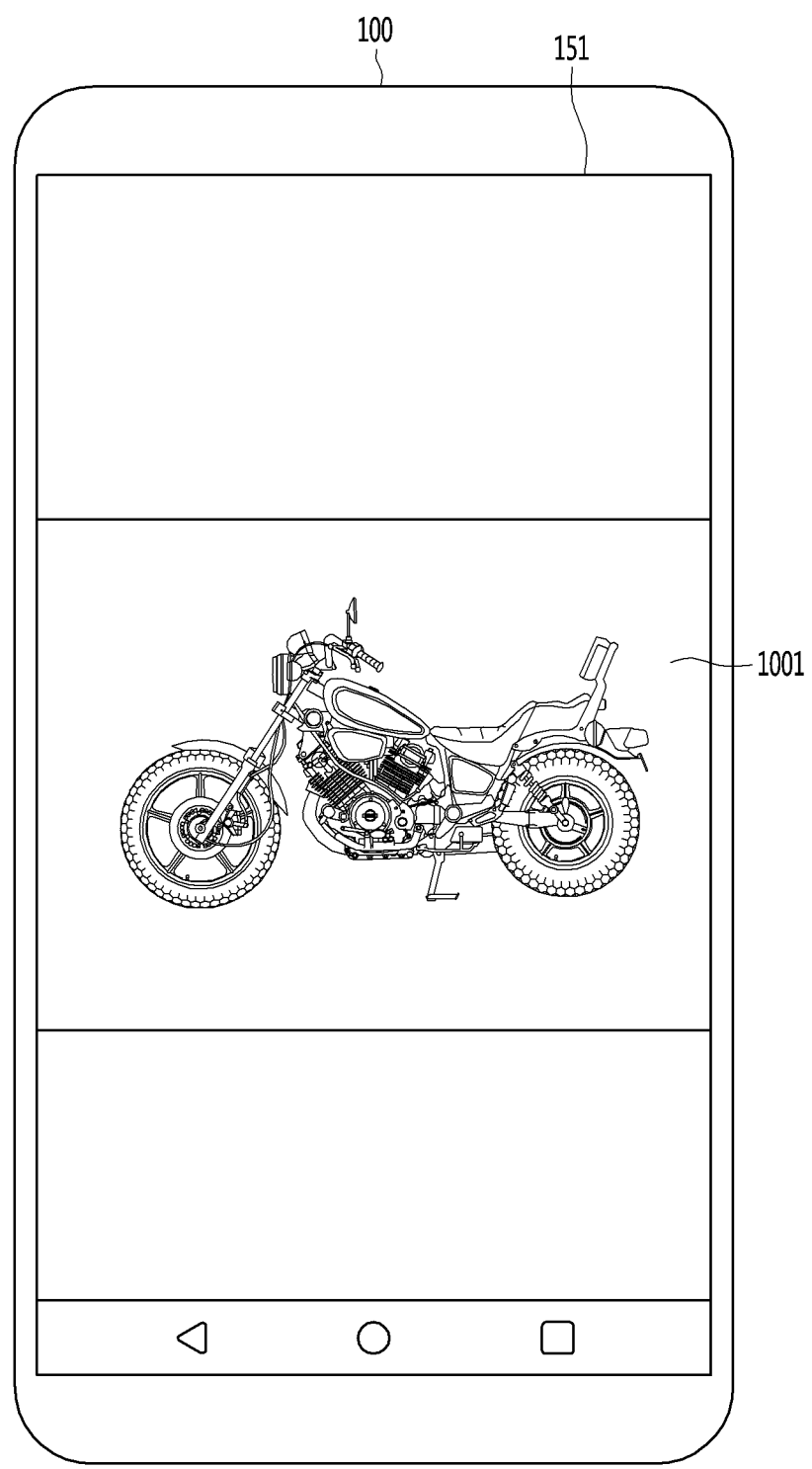

For example, referring to FIGS. 7 and 10, the screen context information may include information on full-screen content 1001 output on the full screen of the display 151 of the artificial intelligence apparatus 100. If the text data corresponding to the speech command of the user is "Delete this picture", the learning processor 130 may determine that "this picture" corresponds to anaphora using the anaphora recognition model, and the processor 180 may specify the picture 1001 output on the full screen as the object referred to by the determined anaphora "this picture" based on the screen context information.

Meanwhile, when the object referred to by the anaphora is not specified, the processor 180 may perform question and answer for specifying the object referred to by the anaphora.

For example, if there is a plurality of candidates which may become the object referred to by the anaphora, the processor 180 may output a screen interface via the display to allow the user to select the object.

In addition, if there is no candidate which may become the object referred to by the anaphora, the processor 180 may output a message indicating that the object may not be specified to the user and output a screen interface via the display to allow the user to input the object.

The processor 180 may determine a response to the speech command based on the specified object (S604). The processor 180 may control the artificial intelligence apparatus 100 according to the determined response (S605).

If the object referred to by the anaphora is specified, the processor 180 may determine the response to the speech command based on the specified object.

The processor 180 may specify the object referred to by the anaphora included in the text data corresponding to the speech command of the user and acquire intent information corresponding to the speech command of the user using a natural language processing (NLP) engine. The processor 180 may determine the response to the speech command based on the acquired intent information.

Figure 9:
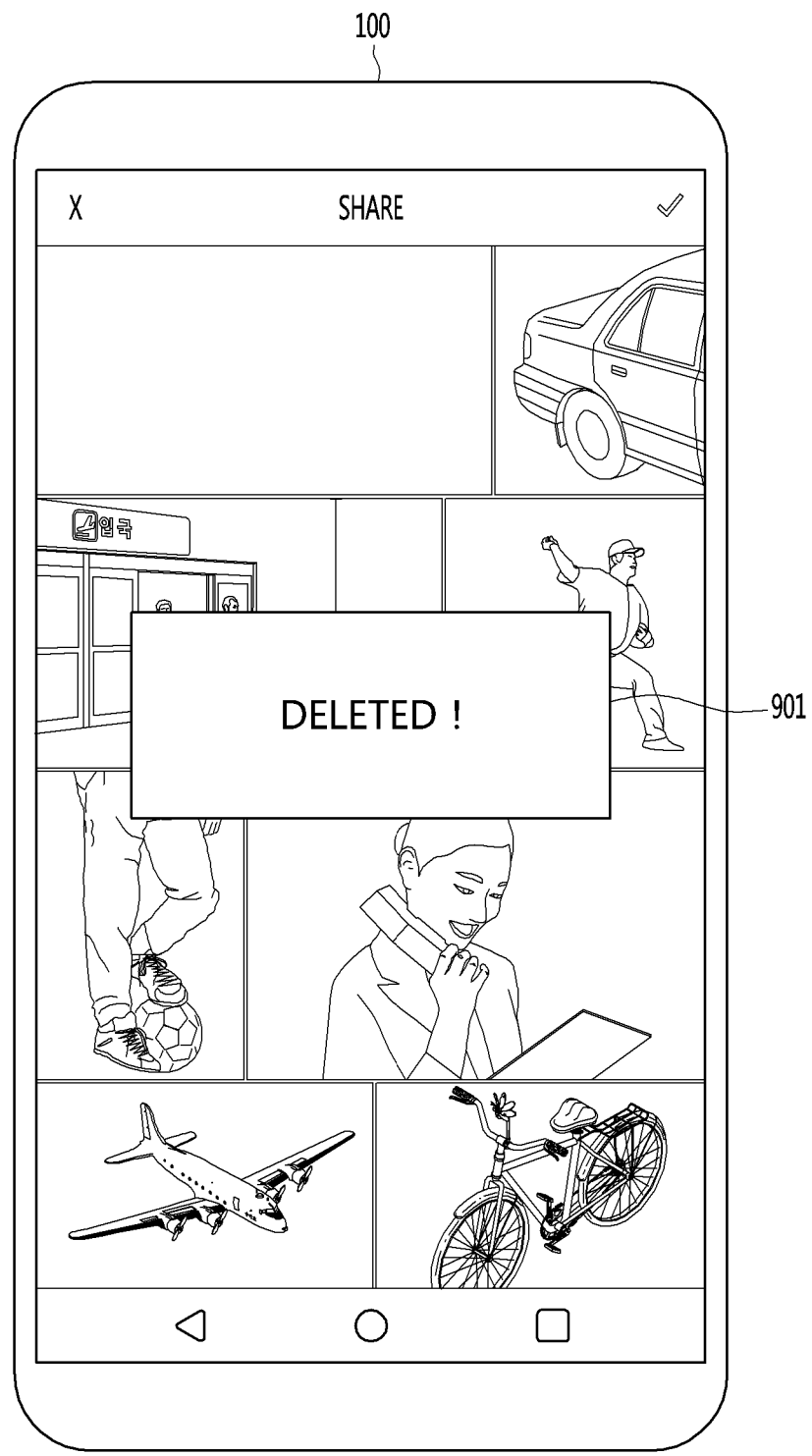

Referring to FIGS. 7 to 9, the processor 180 may specify the selected picture 801 as the object referred to by the anaphora "this picture" included in the text data "Delete this picture" 701 corresponding to the speech command of the user. In addition, the processor 180 may acquire "Delete the selected picture" which is the intent information corresponding to the speech command "Delete this picture" of the user. The processor 180 may determine, as a response to the speech command, operation of outputting an alarm after the selected picture 801 is deleted based on the acquired intent information, and control the artificial intelligence apparatus 100 according to the determined response to delete the selected picture 801 and output the alarm 901 via the display 151.

Figure 11:
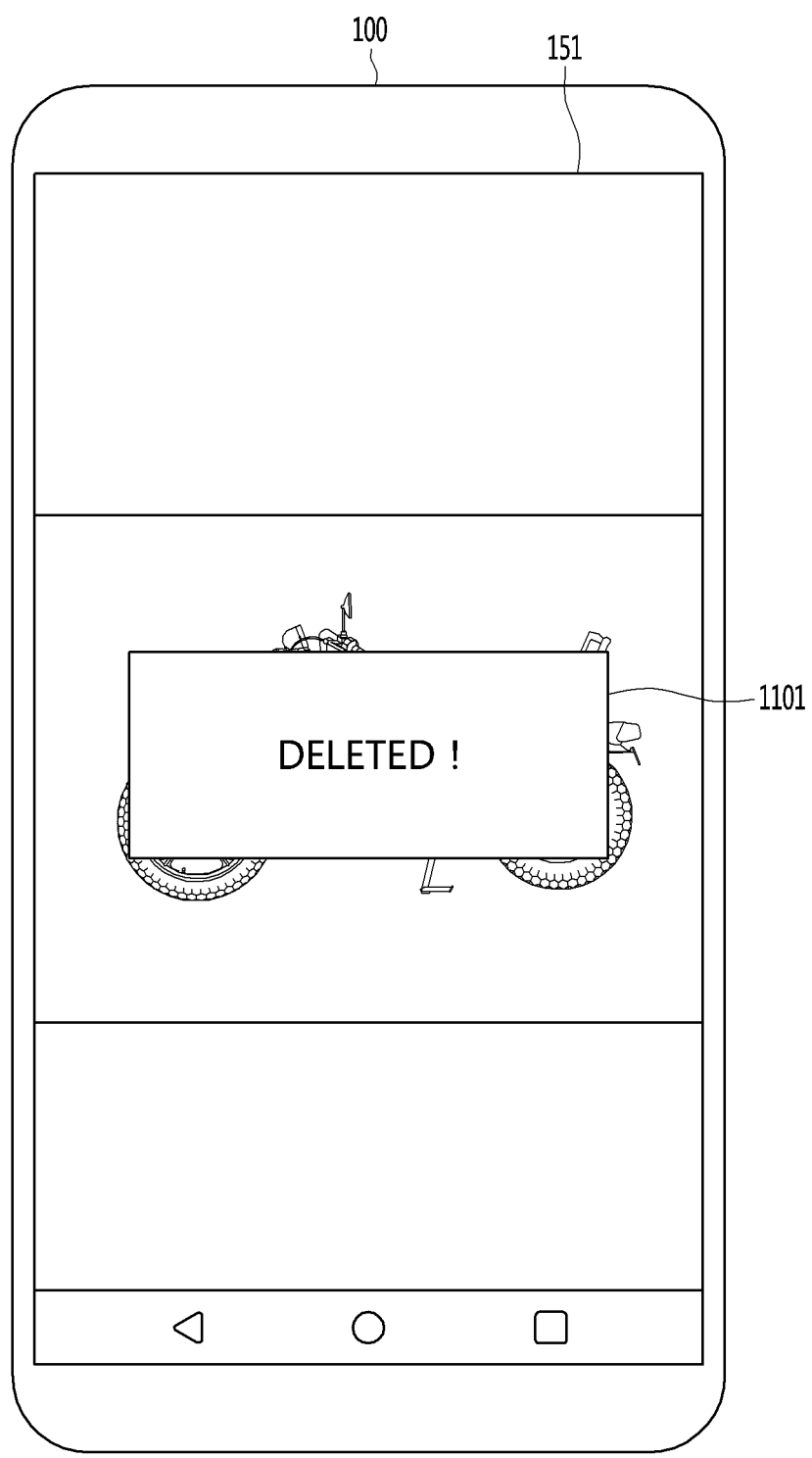

In addition, referring to FIGS. 7, 10 and 11, the processor 180 may specify the full-screen picture 1001 as the object referred to by the anaphora "this picture" included in the text data "Delete this picture" 701 corresponding to the speech command of the user. In addition, "Delete the full-screen picture" which is the intent information corresponding to the speech command "Delete this picture" of the user may be acquired. The processor 180 may determine, as a response to the speech command, operation of outputting an alarm after the full-screen picture 1001 is deleted based on the acquired intent information, and control the artificial intelligence apparatus 100 according to the determined response to delete the full-screen picture 1001 and output the alarm 1101 via the display 151.

Figure 14:
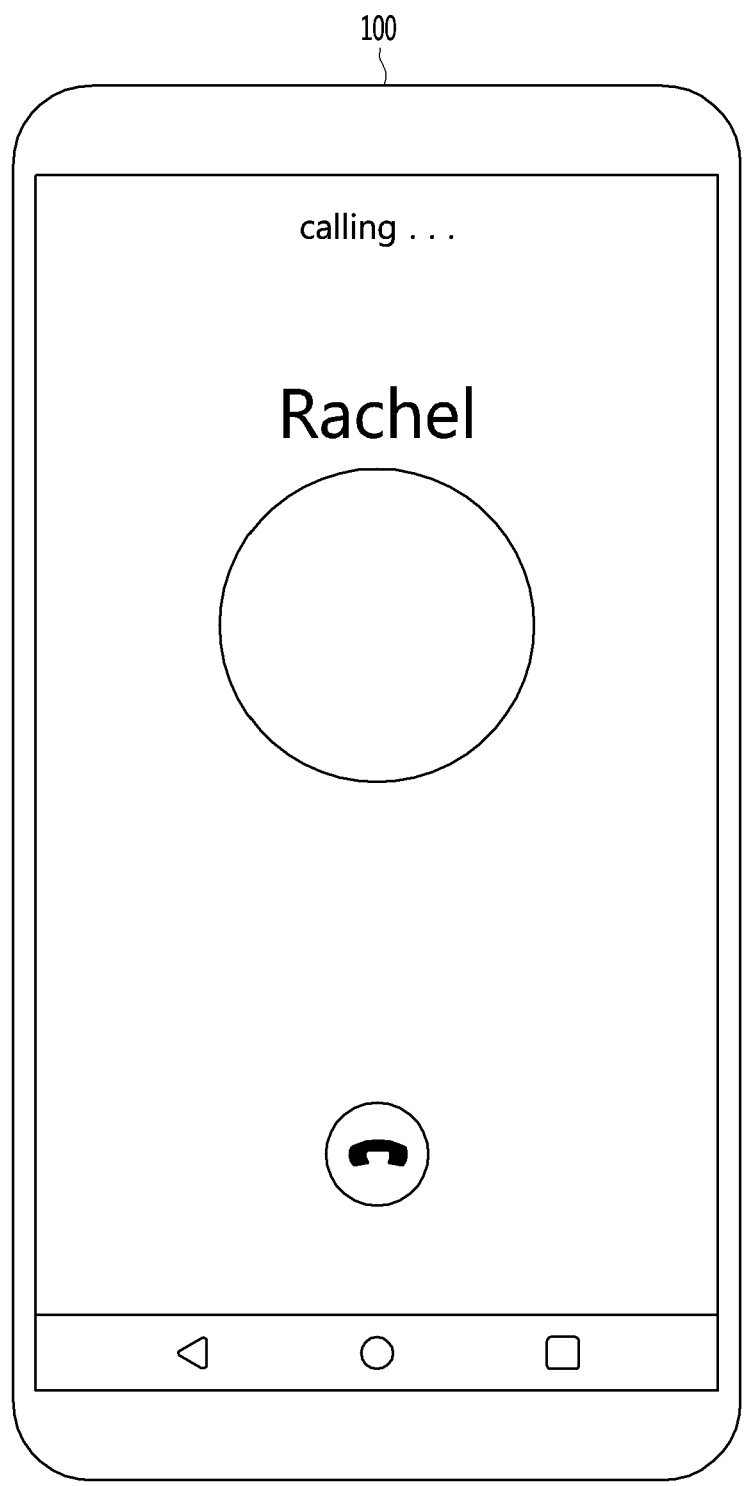

Referring to FIGS. 12 to 14, the processor 180 may specify the selected contact 1301 as the object referred to by the anaphora "this contact" included in the text data "call this contact" 1201 corresponding to the speech command of the user. In addition, the processor 180 may acquire "call the selected contact" which is the intent information corresponding to the speech command "Call this contact" of the user. The processor 180 may determine, as a response to the speech command, operation of calling the selected contact 1301 based on the acquired intent information, and control the artificial intelligence apparatus 100 according to the determined response to call the selected contact 1301.

In addition, the context information may include conversation context information which is information on a conversation history between the user and the artificial intelligence apparatus via a speech command and a response to the speech command.

Figure 15:
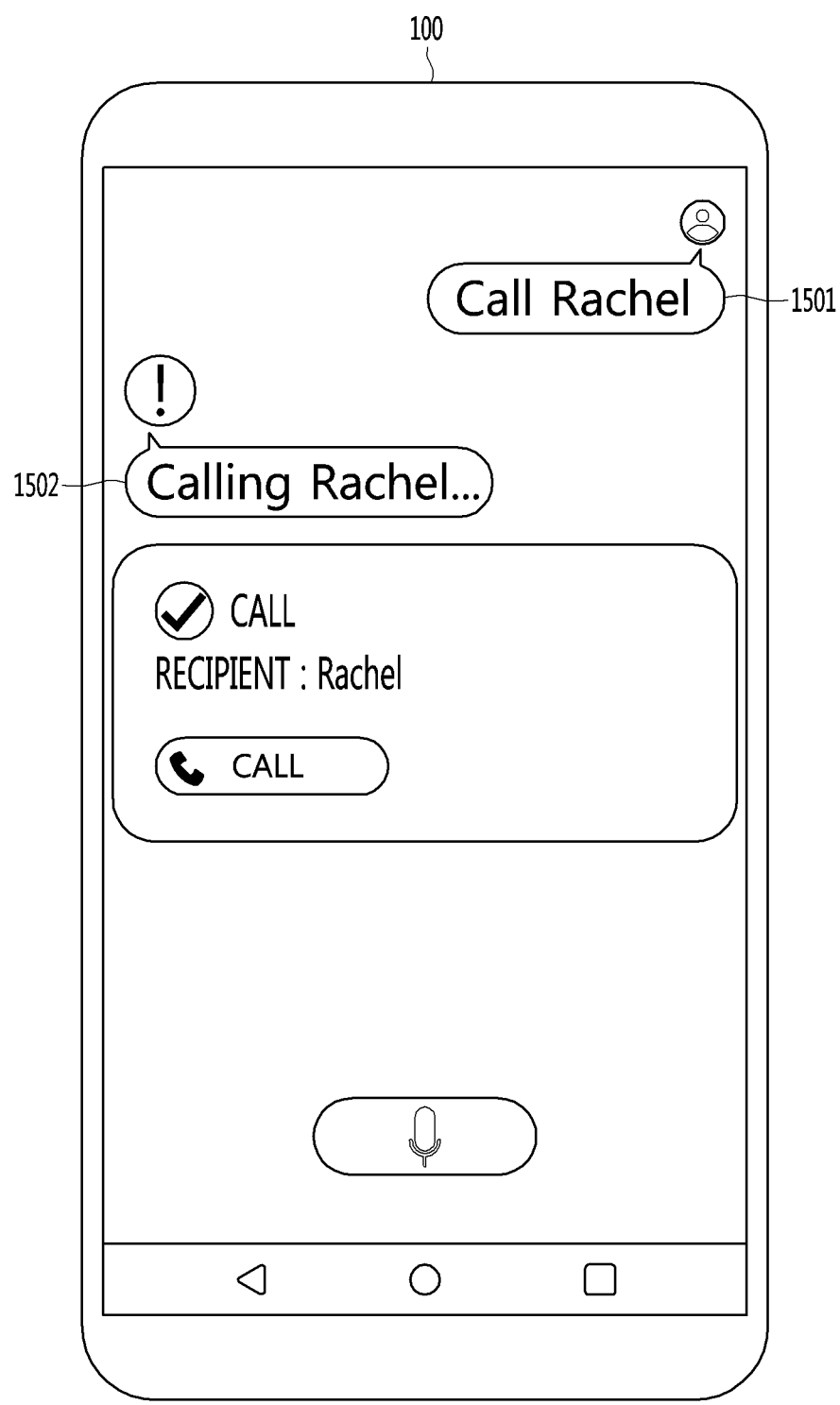
FIG. 15 is a view illustrating conversation context according to an embodiment of the present disclosure.

Referring to FIG. 15, the conversation context information may include information on a conversation history between the user and the artificial intelligence apparatus via the speech command 1501 of the user and the response 1502 to the speech command 1501.

The artificial intelligence apparatus 100 may store, in the memory 170, the conversation context information which is information on the conversation history via the speech command 1501 of the user and the response 1502 to the speech command 1501.

In addition, the processor 180 may manage a candidate which may become the object referred to by the anaphora for each conversation with respect to the conversation context information according to the state.

Figure 19:
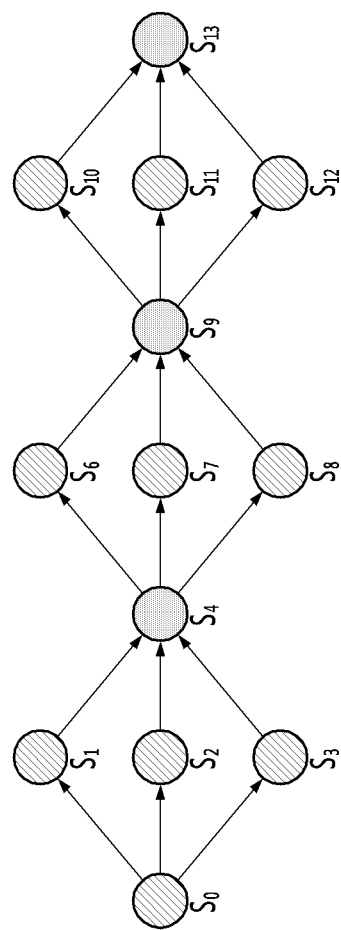
FIG. 19 is a view illustrating a state management method of conversation context according to an embodiment of the present disclosure.

For example, referring to FIG. 19, when the speech command "Send a text message to Rachel, Amy and Andres" of the user is acquired in a state $S_0$, the processor 180 may determine "Rachel", "Amy" and "Andres" as the candidates which may become the object referred to by the anaphora. In addition, the processor 180 may determine "Rachel", "Amy" and "Andres" as states $S_1$, $S_2$ and $S_3$, respectively. Accordingly, when the speech command "Send a text message to them" of the user is acquired in a state $S_4$, the processor 180 may extract the candidates of the object referred to by the non-adjacent anaphora "them" from the previous states $S_1$, $S_2$ and $S_3$ of the state $S_4$ and specify the object.

Figure 17:
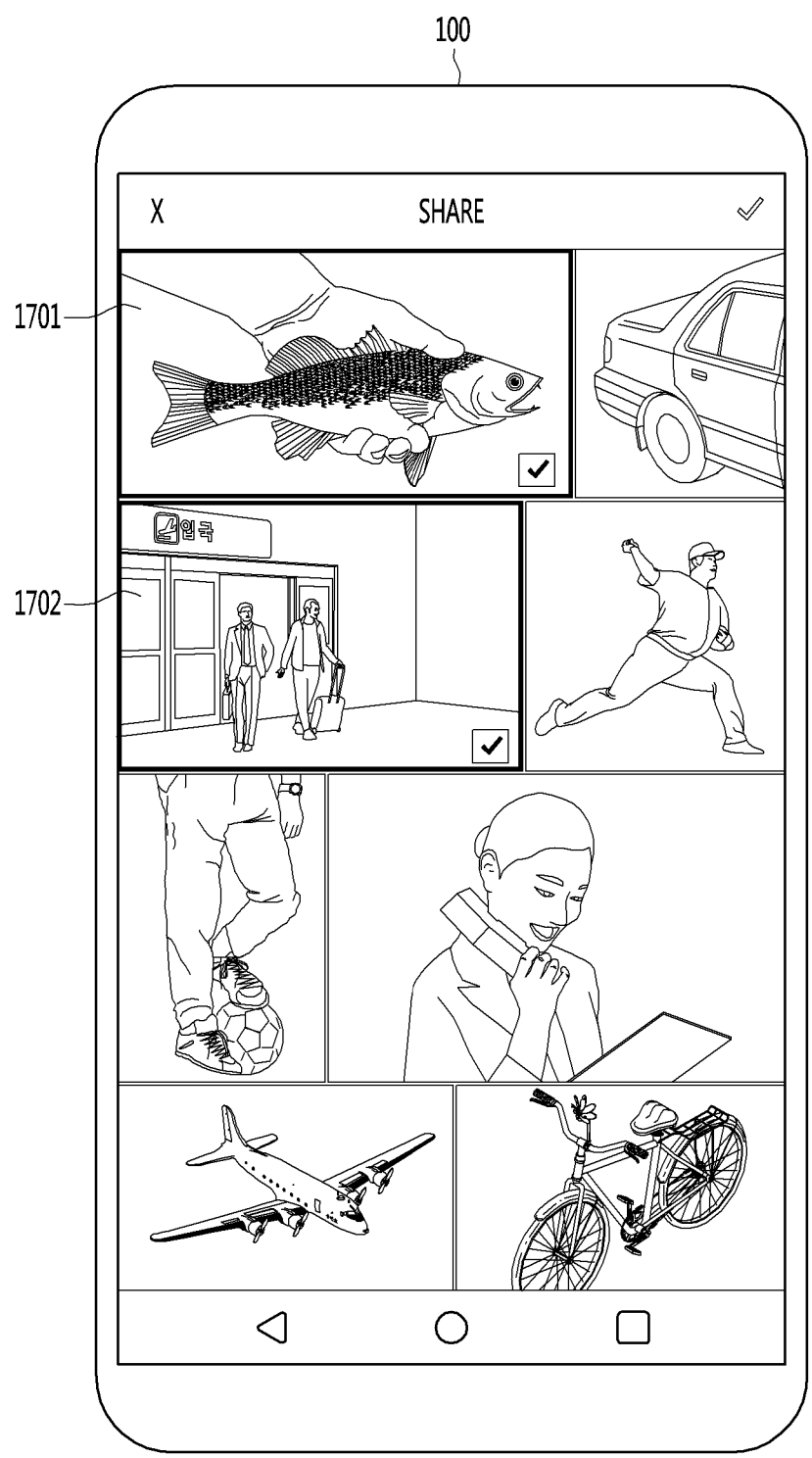
Figure 18:
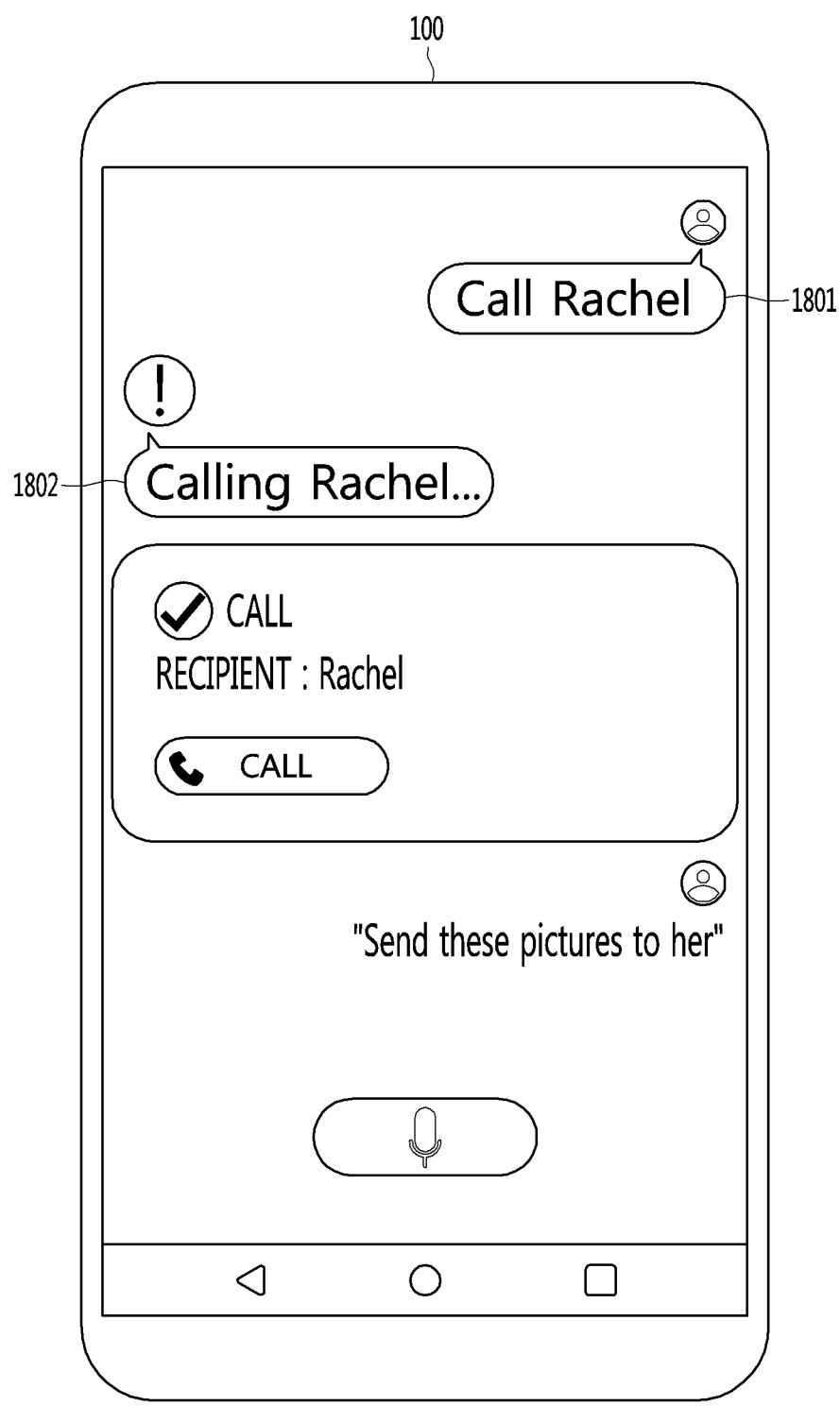

Meanwhile, referring to FIGS. 16 to 18, the processor 180 may specify the plurality of selected pictures 1701 and 1702 as the object referred to by the adjacent anaphora "these pictures" included in the text data "Send these pictures" 1601 corresponding to the speech command of the user based on the screen context information.

In addition, the processor 180 may specify "Rachel" as the non-adjacent anaphora "her" based on the conversation context information 1801 and 1802.

In addition, the processor 180 may acquire "Send these pictures" which is the intent information corresponding to the speech command "Send these pictures" of the user. The processor 180 may determine operation of sending the selected pictures 1701 and 1702 to "Rachel" as the response to the speech command based on the acquired intent information and control the artificial intelligence apparatus 100 according to the determined response to send the pictures to "Rachel".

According to an embodiment of the present disclosure, it is possible to improve a natural language understanding ability for a speech command, by specifying an object referred to by anaphora included in the speech command.

According to an embodiment of the present disclosure, it is possible to improve a natural language understanding ability for a speech command, by specifying an object referred to by anaphora based on screen context information.

According to an embodiment of the present disclosure, it is possible to efficiently specify an object referred to by anaphora by using context information optimized for specifying objects referred to by adjacent anaphora and non-adjacent anaphora.

The present disclosure mentioned in the foregoing description can also be embodied as computer readable codes on a computer-readable recording medium. Examples of possible computer-readable mediums include HDD (Hard Disk Drive), SSD (Solid State Disk), SDD (Silicon Disk Drive), ROM, RAM, CD-ROM, a magnetic tape, a floppy disk, an optical data storage device, etc.

What is claimed is:

1. An artificial intelligence apparatus for performing speech recognition, the artificial intelligence apparatus comprising:
   a microphone configured to receive a speech command of a user;
   a processor configured to:
      determine anaphora included in text data corresponding to the speech command using an anaphora recognition model for determining anaphora included in predetermined text data;
      specify an object referred to by the determined anaphora based on context information including information input to or output from the artificial intelligence apparatus, screen context information including at least information on output content output via a display of the artificial intelligence apparatus and information on selected content selected by the user, and conversation context information which is information on a conversation history between the user and the artificial intelligence apparatus via a speech command and a response to the speech command,
      wherein the anaphora includes at least one of adjacent anaphora referring to an object adjacent to a person or a thing or non-adjacent anaphora referring to an object which is not adjacent to a person or a thing, wherein the adjacent anaphora or the non-adjacent anaphora included in the text data corresponding to the speech command is determined using the anaphora recognition model,
      determine a response to the speech command based on the specified object, and
      control the artificial intelligence apparatus according to the determined response.

2. The artificial intelligence apparatus of claim 1, wherein the processor is further configured to specify the object referred to by the anaphora based on the selected content when at least one selected content is present.

3. The artificial intelligence apparatus of claim 1, wherein, if the output content is full-screen content output on a full screen of the display, the processor is further configured to specify the object referred to by the anaphora based on the full-screen content.

4. The artificial intelligence apparatus of claim 1, wherein the processor is further configured to specify the object referred to by the determined adjacent anaphora based on the screen context information.

5. The artificial intelligence apparatus of claim 1, wherein the processor is further configured to specify the object referred to by the determined non-adjacent anaphora based on the conversation context information.

6. The artificial intelligence apparatus of claim 5,
   wherein the conversation context information includes information on a candidate of an object referred to by anaphora included in text data corresponding to each speech command included in the conversation history, and
   wherein the processor is further configured to specify the object referred to by the determined non-adjacent anaphora based on the candidate of the object referred to by the anaphora.

7. The artificial intelligence apparatus of claim 1, wherein the anaphora recognition model is a neural network trained by a machine learning algorithm or a deep learning algorithm to output an anaphora tagging value of each character or word included in the predetermined text data when the predetermined text data is input to an input layer.

8. A speech recognition method performed by an artificial intelligence apparatus, the speech recognition method comprising:
   receiving a speech command of a user;
   determining anaphora included in text data corresponding to the speech command using an anaphora recognition model for determining anaphora included in predetermined text data;
   specifying an object referred to by the determined anaphora based on context information including information input to or output from the artificial intelligence apparatus, screen context information including at least information on output content output via a display of the artificial intelligence apparatus and information on selected content selected by a user, and conversation context information which is information on a conversation history between the user and the artificial intelligence apparatus via a speech command and a response to the speech command, wherein the anaphora includes at least one of adjacent anaphora referring to an object adjacent to a person or a thing or non-adjacent anaphora referring to an object which is not adjacent to a person or a thing, wherein the adjacent anaphora or the non-adjacent anaphora included in the text data corresponding to the speech command is determined using the anaphora recognition model;
   determining a response to the speech command based on the specified object; and
   controlling the artificial intelligence apparatus according to the determined response.

9. The speech recognition method of claim 8, wherein the specifying of the object includes specifying the object referred to by the anaphora based on the selected content when at least one selected content is present.

10. The speech recognition method of claim 8, wherein the specifying of the object includes, if the output content is full-screen content output on a full screen of the display, specifying the object referred to by the anaphora based on the full-screen content.

11. The speech recognition method of claim 8, wherein the specifying of the object includes specifying the object referred to by the determined adjacent anaphora based on the screen context information.

12. The speech recognition method of claim 8, wherein the specifying of the object includes specifying the object referred to by the determined non-adjacent anaphora based on the conversation context information.

13. The speech recognition method of claim 12,
   wherein the conversation context information includes information on a candidate of an object referred to by anaphora included in text data corresponding to each speech command included in the conversation history, and wherein the specifying of the object includes specifying the object referred to by the determined non-adjacent anaphora based on the candidate of the object referred to by the anaphora.

14. The speech recognition method of claim 8, wherein the anaphora recognition model is a neural network trained by a machine learning algorithm or a deep learning algorithm to output an anaphora tagging value of each character or word included in the predetermined text data when the predetermined text data is input to an input layer.

\* \* \* \* \*